R. F. HUDSON.
RAILWAY SIGNAL.
APPLICATION FILED MAY 25, 1914.
1,238,772.
Patented Sept. 4, 1917.
7 SHEETS—SHEET 1.
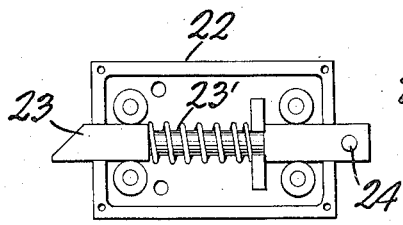
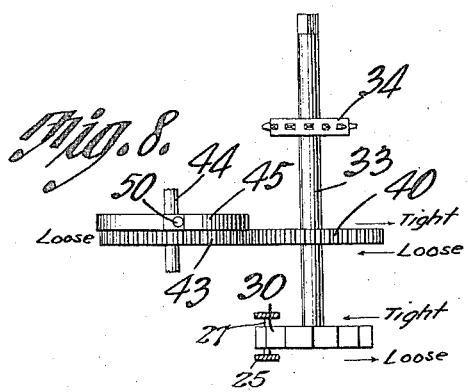
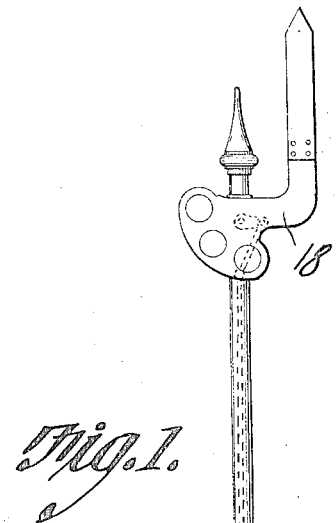
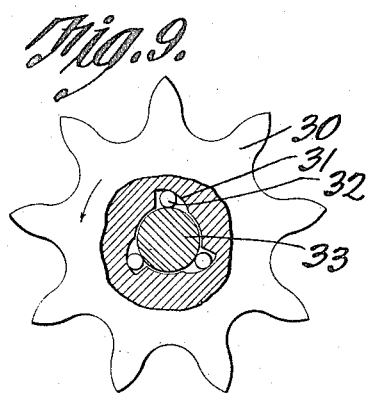
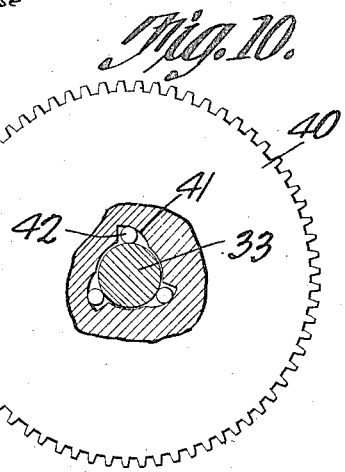
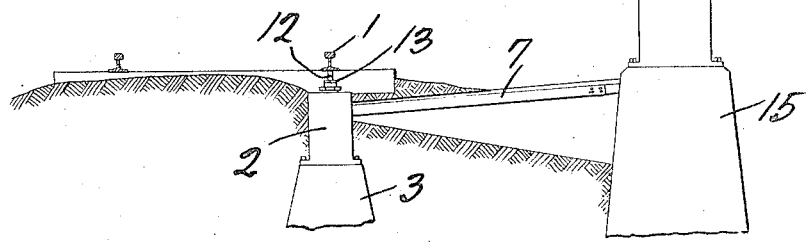
Witnesses
Robert F. Hudson, Inventor
by C. A. Snow & Co., Attorneys

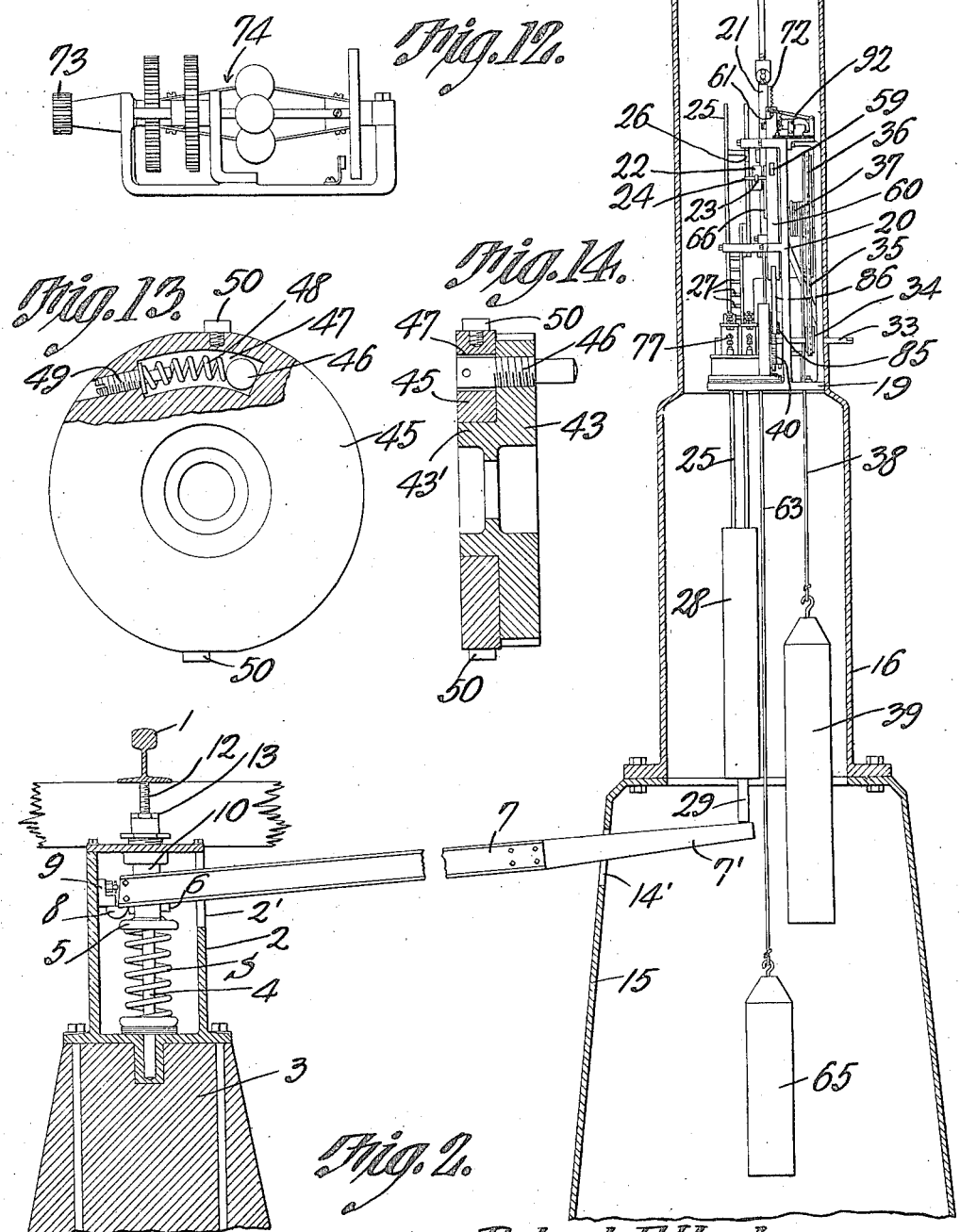

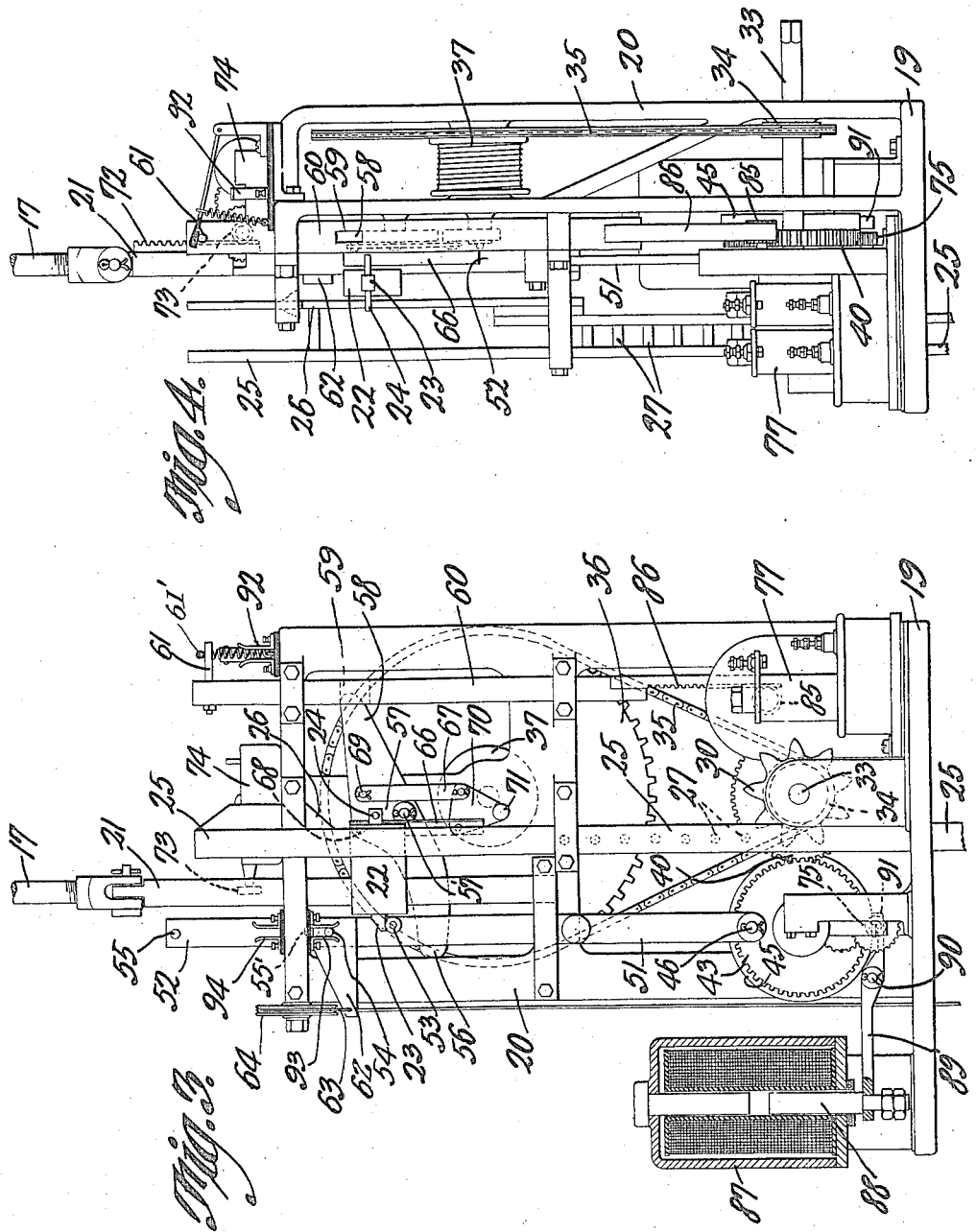

R. F. HUDSON.
RAILWAY SIGNAL.
APPLICATION FILED MAY 25, 1914.
1,238,772.
Patented Sept. 4, 1917.
7 SHEETS—SHEET 4.
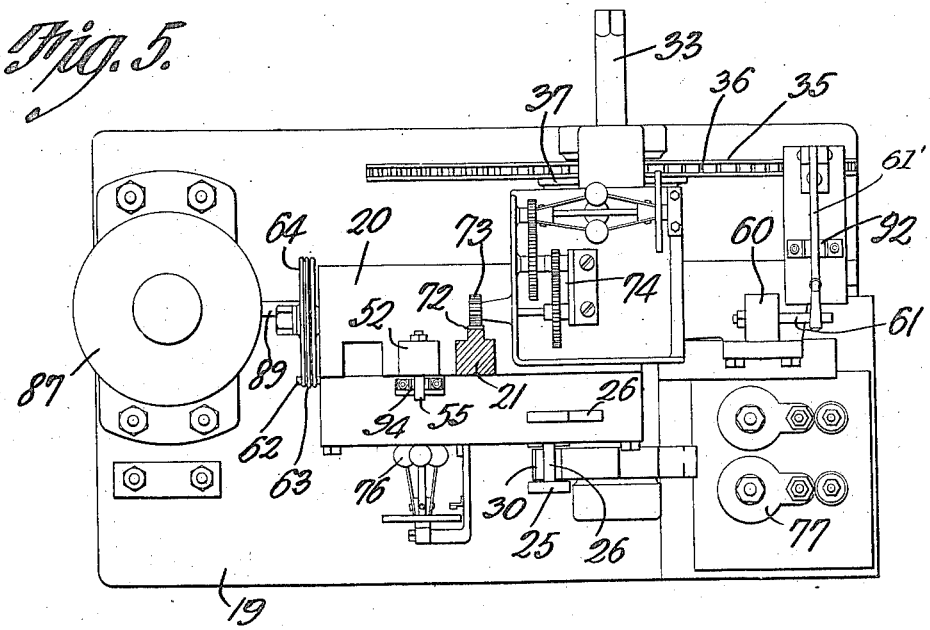
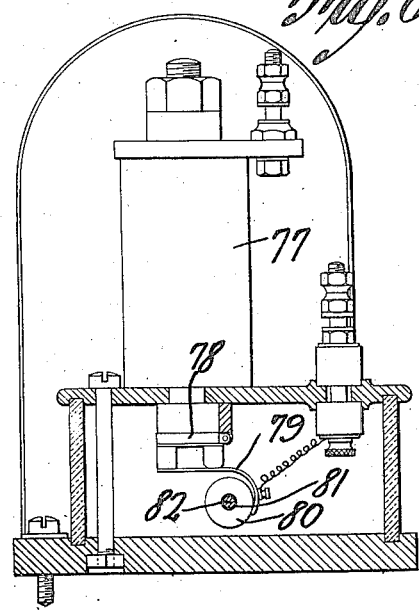
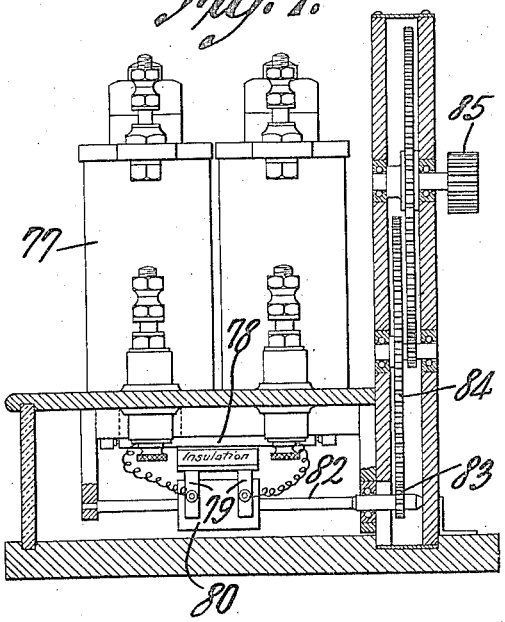
Witnesses
Robert F. Hudson, Inventor
by Chow & Co., Attorneys R. F. HUDSON.
RAILWAY SIGNAL.
APPLICATION FILED MAY 25, 1914.
1,238,772.
Patented Sept. 4, 1917.
7 SHEETS—SHEET 5.
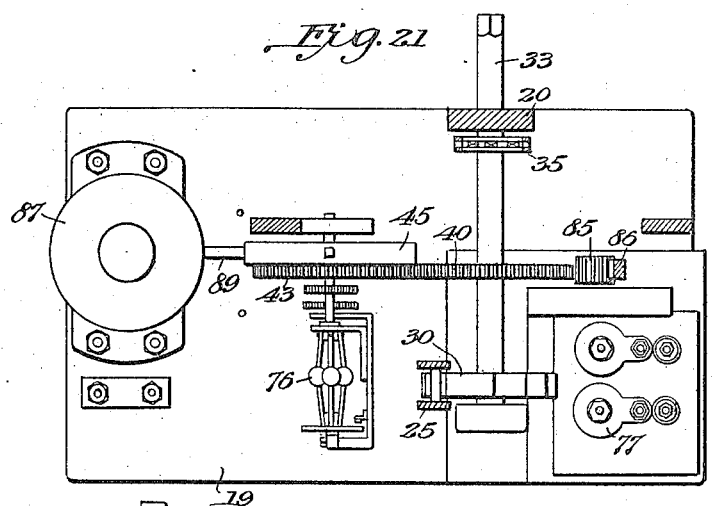
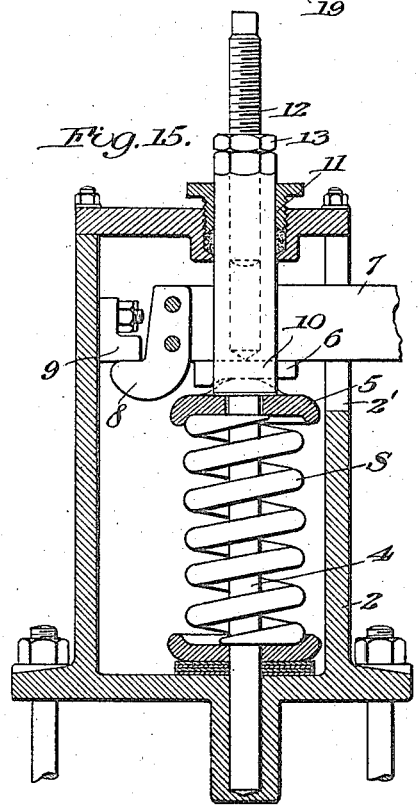
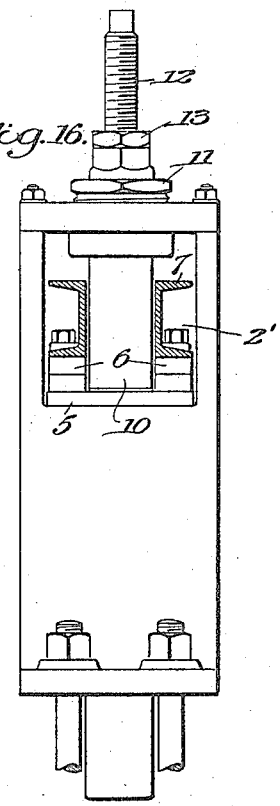
Inventor:
Robert F. Hudson,
by David Moore
his Attorney.

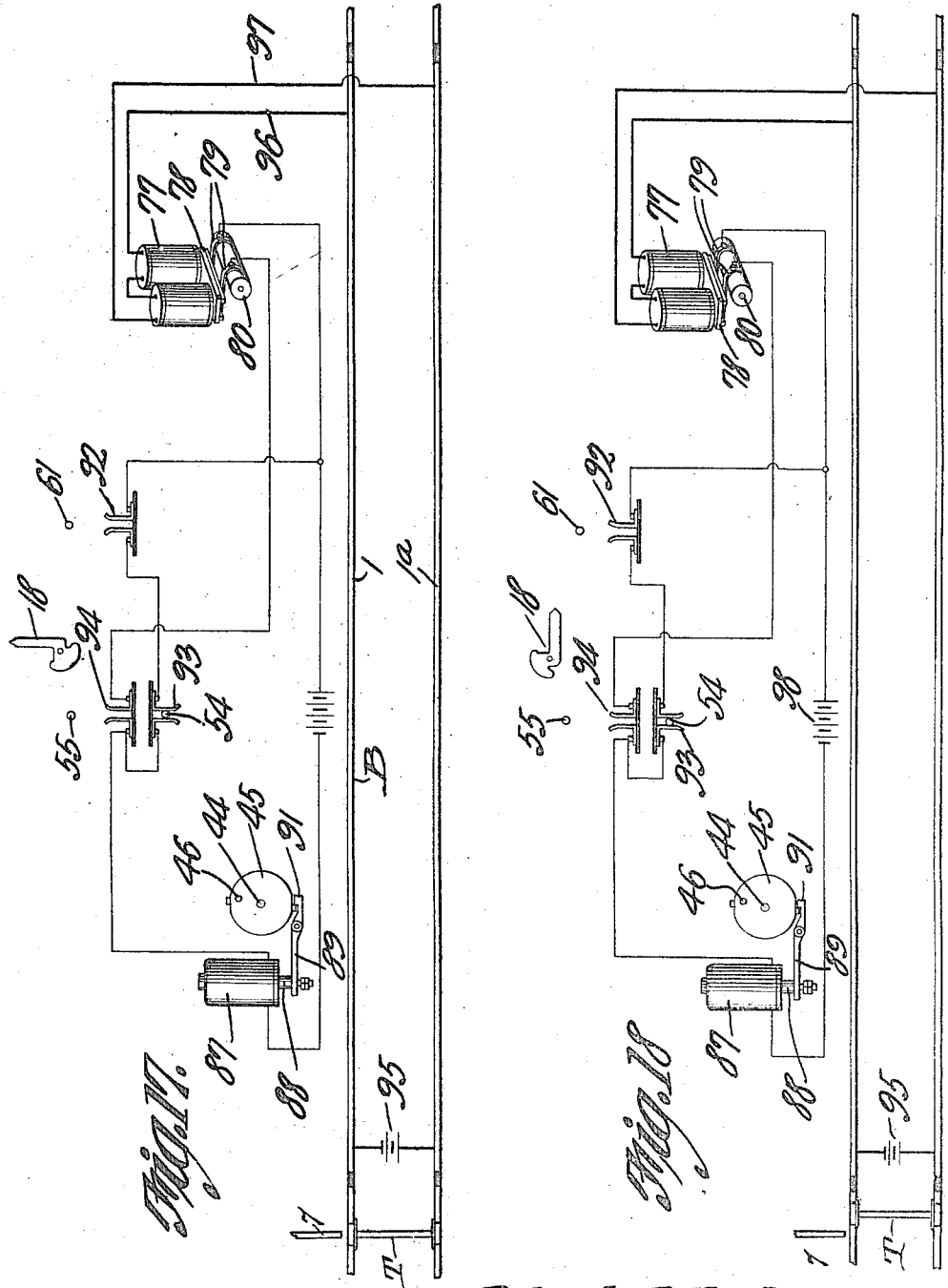

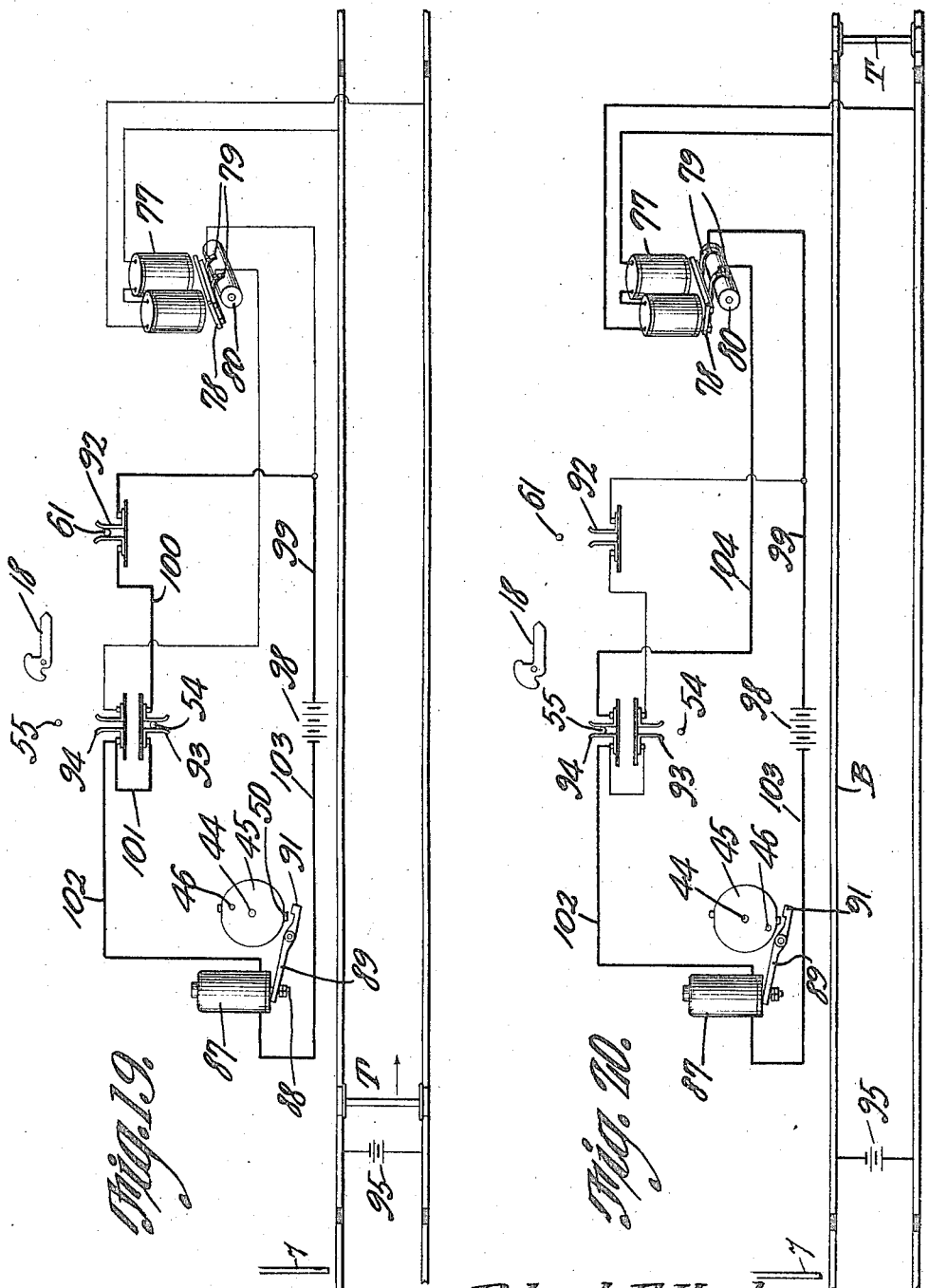

UNITED STATES PATENT OFFICE.

ROBERT F. HUDSON, OF RICHMOND, VIRGINIA, ASSIGNOR, BY MESNE ASSIGNMENTS, TO HUDSON RAILWAY SIGNAL COMPANY, INC., OF RICHMOND, VIRGINIA.

RAILWAY-SIGNAL.

1,238,772.

Specification of Letters Patent.

Patented Sept. 4, 1917.

Application filed May 25, 1914. Serial No. 840,905.

*To all whom it may concern:*

Be it known that I, ROBERT F. HUDSON, a citizen of the United States, residing at Richmond, in the county of Henrico and State of Virginia, have invented a new and useful Railway-Signal, of which the following is a specification.

The present invention relates to improvements in railway signals, and particularly to that class of signal as illustrated in my Patent No. 1,114,477, issued October 20, 1914, one object of the present invention, being the provision of a semaphore actuating mechanism, by means of which the semaphore is operated mechanically or electrically when placed in danger position, and controlled electrically when placed in clear position.

A further object of the present invention, is the provision of a semaphore actuating mechanism in which a power storing mechanism is employed to control the various parts thereof, the power storing mechanism being wound in a compensating manner by means of a train actuated means so that the present device requires very little attention and will automatically control the actuation of the semaphore for a comparatively great number of times before, if at all, necessitating rewinding of the power storing device.

A still further object of the present invention is the provision of means whereby a mechanically actuated train controlled means will release the semaphore to danger position, electrical means being provided for controlling the mechanism for returning the same to clear position, and a single power storing device or motor being employed for actuating the semaphore returning means both in its retracted and semaphore actuating positions.

A still further object of the invention is the provision of a semaphore controlling mechanism which is operated to danger position either mechanically or electrically, thus insuring the displaying of a danger signal due to the failure of the track circuit or due to the actuation thereof by a train entering the block.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—

Figure 1 is a cross sectional view through the railroad bed showing the present semaphore controlling mechanism in elevation.

Fig. 2 is an enlarged detail sectional view through the casing of the rail controlled means having its lever foreshortened, and through the semaphore carrying pole and its base.

Fig. 3 is an enlarged side elevation of a mechanism carried in the semaphore pole and which controls the mechanically and electrically actuated mechanism for the semaphore.

Fig. 4 is a view looking at the right of Fig. 3.

Fig. 5 is a top plan view of the mechanism illustrated in Figs. 3 and 4.

Figs. 6 and 7 are enlarged sectional details of the track relay and the mechanism controlled thereby.

Fig. 8 is an enlarged top plan view showing the shaft for winding the power storing means and through which the power storing means operates the semaphore actuating and returning member.

Fig. 9 is an enlarged sectional detail of the pinion and shaft that is actuated by and to wind the power storing means.

Fig. 10 is an enlarged sectional view of the gear and its ratchet for actuating the semaphore returning means.

Fig. 11 is an enlarged detail view of the latch bolt carried by the semaphore bar.

Fig. 12 is an enlarged detail view of one of the governors used with the present mechanism.

Figs. 13 and 14 are enlarged sectional details of the locking disk and transmission means for controlling the semaphore returning bar.

Fig. 15 is an enlarged vertical section of the rail actuated device of the present mechanism.

Fig. 16 is a view in elevation looking from the right in Fig. 15.

Figs. 17, 18, 19 and 20 are diagrammatic views illustrating the various conditions of the system.

Fig. 21 is a horizontal cross section through Fig. 3 about the middle of the link 51.

Referring to the drawings, the numeral 1 designates one of the track rails, and 2 a casing mounted upon a base 3 below the rail and between the ties, so that a slight depression of the rail due to the passing of a train thereupon operates the mechanism now to be described. The casing 2 is provided with an elongated opening 2' and disposed for vertical movement within the casing is a stem or rod 4 carrying the cap or head 5 at its upper end which is normally held elevated by means of a spring S between the head 5 and bottom of the casing 2. The head 5 has a pair of spaced lugs upon which rest the bearing plates 6 carried by and at the under side of the spaced side members of a lever 7, said lever being provided with the fulcruming hook 8 engaging under a lug 9 carried by the casing 2 opposite the opening 2' through which the lever projects.

A member 10 is disposed for vertical movement through a stuffing box 11 at the upper end of the casing 2 and carries the adjustable rail engaging stem or pin 12 which is locked in the desired adjustment by means of the lock nut 13. Said stem 12 projects upwardly against the base of the rail. Thus when the rail 1 is depressed, the stem 12 is consequently depressed and the member 10 will depress the spring S which normally raises the lever 7, so as to permit the lever 7 to fall by gravity so that its free end 7' which is projected through the slot 14 of the hollow base 15 of the semaphore carrying post or pedestal 16 will release the controlling part of the semaphore mechanism hereinafter described.

Mounted within the semaphore post or casing 16 is a rod 17 which is connected as is usual and customary to the semaphore 18.

The mechanism for directly controlling the rod 17 includes a base 19 carrying a super-structure or frame 20. Mounted for vertical sliding movement within the frame 20 is a bar 21 which is connected to the semaphore controlling rod 17 at its upper end and carries upon one face thereof, the casing 22 which carries a latch bolt 23 projected by a spring 23' and provided with a pin 24 which is disposed in a path to be engaged by a cam 26 upon the vertically reciprocatory bar 25 and a link 66, as will presently appear.

The bar 25 is provided with a plurality of spaced pins 27 forming a rack, while upon its lower end disposed within the base 15 illustrated in Fig. 2, is a weight 28, the stem 29 of the bar 25 being disposed to normally rest upon the end 7' of the lever 7. Thus, the tension of the spring S elevates the end 7' of the lever 7 and bar 25 so as to relieve the effect of the weight thereupon, the lowermost pin 27 of the bar 25 being then above and out of contact with a pinion 30, which is disposed to be rotated by engagement with the pins 27 therewith as the bar 25 is reciprocated due to the action of the lever 7 when released by a train.

The pinion 30 as illustrated in Figs. 8 and 9 is provided with the ratchet 31 for the reception of the ball or roller pawls 32 thereby providing means to grip or clutch the shaft 33 of the pinion when the bar 25 moves downwardly, so that the shaft 33 is rotated, the upward movement of the bar 25 due to the return of the lever 7 rotating the pinion 30 in an opposite direction to the arrow in Fig. 9 without affecting the shaft 33, and as before stated, the lowermost pin 27 when the bar 25 is in its uppermost position being out of engagement with the pinion 30 so that the same may rotate with the shaft 33 when the shaft 33 is used for a transmitting shaft for returning the semaphore from danger to clear position.

Fixed upon the shaft 33 is a small sprocket wheel 34 which has trained thereover, a sprocket chain 35, said sprocket chain connecting the sprocket wheel 34 to the large relatively thin sprocket wheel 36 journaled in the frame 20 and carrying a winding drum 37 which constitutes with the cable 38 wound upon the drum and the weight 39 attached to the cable, the power storing mechanism and motor for the present device.

It will thus be seen that as the bar 25 is reciprocated due to the passage of a train upon the rail and the consequent elevation and lowering of the lever 7 to operate the pinion 34, the drum 37 will be rotated to wind the cable 38 thereupon so that the weight 39 will at the proper time rotate the shaft 33 in an opposite direction and through balls or pawls 42 and ratchet 41, as seen in Fig. 10, actuate a power transmitting gear 40 disposed upon the shaft 33 so as to be inactive when the pinion 30 is rotating operating the shaft 33.

The gear 40 is in mesh with and transmits motion to a gear 43 which is freely rotatable upon a shaft 44 mounted in the frame 20, a disk or annular member 45 being carried upon the boss 43' of the gear 43 as illustrated in Fig. 14. A pin 46 is carried by the gear 43 and projects through the arcuate slot 47 of the annular member or disk 45, a spring 48 being disposed in the slot 47 between the pin 46 and an adjusting screw 49 carried by the disk 45, whereby yielding movement may be transmitted from the gear 43 to the disk 45, said disk 45 being provided with two diametrically disposed lugs or studs 50 upon its periphery which act in conjunction with a mechanism hereinafter described as a locking means to hold through the medium of the gears 43 and 40, the power storing mechanism. By this construction, a cushioned action is had between the disks 45 and the gear 43 to compensate for the jar of the bar 52 at the end of its different movements, as will later appear.

Connected to the pin 46 of the gear 43 is a pitman 51 connected to the lower end of the vertically reciprocable rod or bar 52 mounted in the frame 20 parallel with the semaphore actuating or controlling bar 21. This bar 52 is provided with a pin 53 which is disposed in a path to be engaged by the bolt 23, when in the position shown in Fig. 3, with the bar 21 and the semaphore actuating rod elevated or in clear position. Also carried by the rod 52 are switch pins 54 and 55, and a pin 55' for engagement with the end 56 of the walking beam or lever 57 whose opposite end 58 is disposed within the slot 59 of the vertically reciprocable bar or member 60.

The walking beam 57 is pivoted at 57' to the frame 20 and is provided with pins 68 and 69 to which are connected the two parallel links 66 and 67, the lower ends of said links being pivotally connected to the triangular shaped member 70 pivoted at 71 to the frame 20, the purpose of which will presently appear.

Carried by the reciprocatory member 60 at the upper end thereof and projecting from one face thereof is a switch operating pin 61.

Fixed to and carried by the bar 52 is an arm 62, which has a cable 63 connected thereto trained over a pulley 64 and downwardly into the base 15 and having connected to its free end, the weight 65 which is a compensating weight adapted to be elevated when the semaphore 18 and the rod 17 are actuated to danger position, such weight as will presently appear coöperating with the weight 39 to assist in the return of the semaphore. The weight 65 is lighter than the combined weight of the rod 17, the semaphore 18 and the bar 21, so that when the semaphore is in lowermost or danger position the weight 65 will be elevated.

Formed upon one face of the bar 21 is a toothed rack 72, which engages the gear 73 of a governor 74, this governor being provided to prevent the too sudden dropping and elevation of the rod 17.

A gear 75 is also in mesh with the gear 43 and controls the governor 76 which is similar to the governor 74 to thus retard and prevent the too rapid motion of the gear 43 and the bar 52 controlled thereby.

The electric magnets 77 of a track relay controlled as will later appear, have under their influence, an armature 78, which carries the two combination circuit closing and brake applying fingers 79 which are disposed in coactive relation to the metal wheel or cylinder 80 insulated at 81 from its shaft 82. This shaft 82 is provided with a small gear 83 which controls through a train of gears 84 as illustrated in Fig. 7, a small gear 85 which is in mesh at all times with a toothed rack 86 carried by the bar 60.

Also mounted upon the base 19 is a solenoid 87, the control of which will be set forth in describing the electrical diagrams, and under the influence thereof is the core 88, which is connected to the lever 89, said lever 89 being pivoted at 90, so that its hooked terminal 91 is disposed in the path to engage either one of the lugs 50 and thus lock the gear 43 and bar 52 either in its lowermost or highermost position.

It will thus be seen that when installing the present device, and placing the same in operative condition, the shaft 33 may be manually operated to wind the drum 37 and consequently store power for controlling the present mechanism, the lever 7 being so adjusted that the lower end thereof will abut the stem 29 and thus hold the bar 25 elevated with its pins 27 out of engagement with the sprocket 30. As the track relay 77 is normally energized, the brake fingers 79 engage the wheel 80 and consequently hold the shaft 82 against rotation and with the circuit controlling bar 60 raised so that the pin 61 elevates the spring pressed switch 61' out of engagement with the contacts 92. When the parts are in this position, as clearly illustrated in Fig. 3, the pin 54 is in engagement with the switch contacts 93, while the pin 55 is out of engagement with the switch contacts 94. At the same time, the pin 53 underrides the bolt 23 and holds the bar 21 elevated with the semaphore 18 in clear position.

With the electrical diagram as shown in Fig. 17, the block B is vacant, and therefore the circuit including the battery 95, closed through the rails 1 and 1ª and through the conductors 96 and 97 will thus energize the track magnets 77. In this view, the energized circuit is illustrated in heavy lines.

Presupposing that the train T is entering the block so as to pass a point in rear of the insulated joint of the block so as to depress the lever 7 located at said point and consequently release the bar or member 25, the cam 26 will be moved into engagement with the pin 24 to retract the bolt 23 from the pin 53 so that the semaphore rod 17 and bar 21 fall to lowermost position to signal danger to another train before the battery 95 has been short circuited. Thus the semaphore 18 will be placed in danger position solely by mechanical means, and the track relay magnets 77 will still for an instant be energized, the pins 54, 55 and 61 as illustrated in Fig. 18, being in the same position, as under normal conditions, shown in Fig. 17.

As the train T short circuits the battery 95, as illustrated in diagram in Fig. 19, the track relay magnets 77 are deënergized to release the armature 78 so that the combined contact and brake fingers 79 release the wheel 80 and consequently the shaft 82 so that the bar 60 will fall by gravity and bring the switch 61' into contact with the switch contacts 92 to thus close the circuit as illustrated in Fig. 19 which includes the battery 98, the conductor 99, the switch contacts 92 and switch 61', the conductor 100, the switch contacts 93 and pin 54 (the bar 52 remaining in its elevated position), the conductors 101 and 102, the solenoid 87, and the conductor 103. Thus the solenoid 87 is energized, and its core 88 swings the lever 89 to release the hooked end 91 from engagement with one of the lugs 50 of the disk 45, and thus permits the power storing means to rotate the shaft 33, and the gears 40 and 43 and the disk 45, and consequently pull upon the pitman 51 to lower the bar 52 so as to disengage the pin 54 from the switch contacts 93 and place the pin 55 in engagement with the switch contacts 94. The solenoid 87 is energized only for an instant as the removal of the pin 54 from the switch contacts 93 opens the circuit just described, and this permits the locking lever 89 to assume the position to engage the other lug 50 and thus permit the disk 45 to rotate 180 degrees only. Thus, the bar 52 will be locked in its lowermost position with the pin 55 engaging the switch contacts 94. At the same time that the bar 52 was lowered, its pin 55' engaged the end 56 of the walking beam 58 and caused the elevation of the bar 60 so that its pin 61 elevated the spring closed switch lever 61' and released it from the switch contacts 92. At the same time, the pin 53 engages the cam end of the locking bolt 23, moving the same against its spring 23' so that the pin 53 was disposed therebelow and caused the bar 21 to be placed in a position for elevation by the bar 52 when the same is again actuated to clear the signal.

In order to restore the semaphore 18 to its normal clear position, the train T having left the block B (referring to Fig. 20), the track relay magnets 77 are energized and consequently attract their armature 78 to place the circuit closing and brake fingers 79 in engagement with the wheel 80 and as the pin 55 is in engagement with the contacts 94, the following circuit is closed to energize the solenoid 87 to release the lever 89 and consequently permit the power storing device to operate through the medium of the gears 40 and 43 to elevate the bar 52 and return it to the position as shown in Fig. 3. This condition is particularly shown in Fig. 20, and the circuit then closed and controlling the solenoid 87, includes the battery 98, the conductor 99, one contact finger 79, the wheel 80, the remaining contact finger 79, the conductor 104, the switch contacts 94 and pin 55, the conductor 102, the solenoid 87 and the conductor 103.

This circuit is energized only for an instant, but sufficiently long for the power storing device to elevate the bar 52 and remove the pin 55 from engagement with the contacts 94 so that the locking lever 89 is released to engage the next succeeding lug 50 to lock the parts in the position as shown in Fig. 3 with the pin 54 in engagement with the contacts 93.

In order to provide a means to cause the semaphore to move to danger, in case the track relay should be short circuited by the presence of a train within the block or otherwise, or should the lever 7 fail to do its duty, the deënergization of the track relay magnets 77 will cause the armature 78 to fall and disengage the brake fingers 79 from the wheel 80 so that the bar 60 will be released and permitted to fall. Thus the walking beam 58 will be actuated so that the links 66 and 67 will be moved to the right as viewed in Fig. 3, and as the link 66 is disposed in the path of the pin 24, said pin 24 is engaged and the bolt 23 retracted from the path of the pin 53, thus releasing the semaphore controlling bar 21 to gravity so that the semaphore 18 will fall to danger position in a similar manner as when acted upon by the cam 26 when the bar 25 is lowered.

What is claimed is:

1. In a railway signal mechanism, signal controlling means normally in one position and biased to move to another position, train actuated means normally holding said means and adapted when actuated by a train to release the signal controlling means, actuating means operable for causing the signal controlling means to move from its normal to its other position and for returning the signal controlling means to normal position, means for normally locking said actuating means in either of two positions, whereby when the actuating means is in one position it will when moved return the signal controlling means and when the actuating means is in the other position it will when moved cause the signal controlling means to move from its normal to its other position if it has not already done so, and train controlled means for moving said locking means to releasing position.

2. In a railway signal mechanism, signal controlling means normally in one position and biased to move to another position, actuating means operable when in one position to return the signal controlling means to normal position and when in another position to cause the signal controlling means to move from its normal to its other position, means for normally locking said actuating means in either position, and train controlled means for moving the locking means to releasing position.

3. In a railway signal mechanism, signal controlling means, train actuated means cooperable therewith whereby when the train actuated means is operated the signal controlling means is moved from one position to another, actuating means for returning the signal controlling means, means for normally locking the actuating means, train controlled means for moving the locking means to releasing position, and means whereby when the train actuated means is operated it operates the actuating means to store reserve power therein.

4. In a railway signal mechanism, signal controlling means normally in one position and movable when released to another position, train actuated means operable for releasing said means, actuating means operable for returning the signal controlling means, means for normally locking the actuating means, train controlled means for moving the locking means to releasing position, and means whereby when the train actuated means is operated it operates the actuating means to store reserve power therein.

5. In a railway signal mechanism, signal controlling means normally in one position and movable when released to another position, actuating means operable for returning the signal controlling means and for releasing it, means for normally locking said actuating means to either return or release the signal operating means, train controlled means for moving the locking means to releasing position to either return or release the signal controlling means, and train actuated means for operating the actuating means to store reserve power therein.

6. In a railway signal mechanism, signal controlling means, actuating means operable for returning the signal controlling means to normal position, means for normally locking the actuating means, train controlled means for moving the locking means to releasing position, and train actuated means coöperable with the signal controlling means whereby when the train actuated means is operated, the signal controlling means is moved from normal position, the train actuated means being connected with the actuating means whereby the train actuated means operates the actuating means to store reserve power therein.

7. In a railway signal mechanism, signal controlling means normally in one position and movable when released to another position, train actuated means operable for releasing said means, actuating means operable for returning the signal controlling means, means for normally locking said actuating means, train controlled means for moving said locking means to releasing position, and means operatively connecting the train actuated means and actuating means whereby the operation of the train actuated means operates the actuating means to store reserve power therein.

8. In a railway signal mechanism, signal controlling means, actuating means operable for moving the signal controlling means to one position or the other, an electrical circuit having an electrically operated device for moving said locking means to releasing position and a pair of portions connected in parallel, a normally closed train controlled switch and a normally open switch for one of said parallel portions, and a normally closed switch and a normally open switch for the other parallel portion, means controlled by the train controlled switch for closing the second mentioned normally open switch when the train controlled switch is opened, the first mentioned normally open and second mentioned normally closed switches being closed and opened, respectively, when the signal controlling means is moved from one position to another.

9. In a railway signal mechanism, signal controlling means normally in one position and movable when released to another position, actuating means operable for releasing the signal controlling means and for returning it to normal position, means for locking the actuating means in position to either release or return the signal controlling means, an electrical circuit having an electrically operated device for moving the locking means to releasing position and having a pair of portions connected in parallel, a normally closed train controlled switch and a normally open switch for one of said parallel portions, a normally closed switch and normally open switch for the other parallel portion, and means controlled by the train controlled switch for closing the second mentioned normally open switch when the train controlled switch is opened, the first mentioned normally open and second mentioned normally closed switches being closed and opened, respectively, when the signal controlling means is released and moved from normal position.

10. In a railway signal mechanism, signal controlling means, actuating means operable for moving the signal controlling means from and to normal position, means for locking the actuating means in position to move the signal controlling means in either direction, an electrical circuit having an electrically operated device for moving the locking means to releasing position and a pair of portions connected in parallel, a normally closed train controlled switch and a normally open switch for one of said parallel portions, a normally closed switch and a normally open switch for the other parallel portion, means controlled by the train controlled switch for closing the second mentioned normally open switch when the train controlled switch is opened, the first mentioned normally open switch and the second mentioned normally closed switch being operated by the actuating means in order that when the signal controlling means is moved from normal position, said switches are closed and opened, respectively.

11. In a railway signal mechanism, signal controlling means normally in one position and movable when released to another position, actuating means operable for releasing the signal controlling means and for returning it to normal position, means for normally locking said actuating means, an electrical circuit having an electrically operated device for moving said locking means to releasing position and a pair of portions connected in parallel, a normally closed train controlled switch and a normally open switch for one of said parallel portions, a normally closed switch and normally open switch for the other parallel portion, means controlled by the train controlled switch for closing the second mentioned normally open switch when the train controlled switch is opened, the first mentioned normally open and second mentioned normally closed switches being operated by the actuating means so that they are opened and closed, respectively, when the signal controlling means is released and moved from normal position.

12. In a railway signal mechanism, a gravity operated reciprocable bar for controlling a signal, said bar having a rack, a wheel, a pinion connected to said wheel and meshing with said rack, and a relay whose armature has spring means normally engaging said wheel to hold it stationary with said bar elevated, said spring means and wheel providing a normally closed switch.

13. In a railway signal mechanism, a reciprocatory signal operating bar, a second reciprocatory bar adjacent the signal operating bar, actuating means for reciprocating the second bar, means for normally locking the actuating means, train controlled means for moving the locking means to releasing position, latch means carried by one of said bars and engageable with the other whereby the second bar can return the signal operating bar to normal position, and train controlled means for moving the latch means to releasing position when the signal operating bar is in normal position.

14. In a railway signal mechanism, a reciprocatory signal operating bar, a second reciprocatory bar, actuating means for reciprocating the second bar, means for normally locking the actuating means, train controlled means for moving said locking means to releasing position, latch means carried by one of said bars and engageable with the other whereby the second bar returns the signal operating bar to normal position, and a third reciprocatory train controlled bar having means for moving the latch means to releasing position.

15. In a railway signal mechanism, a reciprocatory signal operating bar, a second reciprocatory bar, actuating means for reciprocating the second bar, means for normally locking the actuating means, train controlled means for moving said locking means to releasing position, latch means carried by one of said bars and engageable with the other whereby the second bar returns the signal operating bar to normal position, a third reciprocatory train controlled bar having means for moving the latch means to releasing position, and means operated by the third bar for actuating the actuating means so as to store reserve power therein.

16. In a railway signal mechanism, a vertical reciprocatory signal operating bar, a latch carried thereby, a second vertical reciprocatory bar having a portion engageable under said latch, the second bar being normally raised to hold the signal operating bar elevated, actuating means for reciprocating the second bar, means for normally locking the actuating means, train controlled means for moving the locking means to releasing position, a third vertical reciprocatory bar, train controlled means for normally holding the third bar elevated, a lever engaged with the third bar, the second bar having means engageable with the lever to raise the third bar when the second bar is lowered, and means operated by the lever for moving the latch to releasing position when the third bar is lowered.

17. In a railway signal mechanism, a vertical reciprocatory signal operating bar, a second vertical reciprocatory bar normally in raised position, a latch carried by the signal operating bar, the second bar having means engageable under said latch to hold the signal operating bar raised, actuating means for reciprocating the second bar, means for normally locking the actuating means, train controlled means for moving the locking means to releasing position, a third vertical reciprocatory bar normally in raised position and having means for moving the latch to releasing position when it is lowered, and mechanical train operated means for normally holding the third bar raised and whereby it is reciprocated by a train for releasing the latch.

18. In a railway signal mechanism, a vertical reciprocatory signal operating bar, a second vertical reciprocatory bar normally in raised position, a latch carried by the signal operating bar, the second bar having means engageable under the said latch to hold the signal operating bar raised, actuating means for reciprocating the second bar, means for normally locking the actuating means, train controlled means for moving the locking means to releasing position, a third vertical reciprocatory bar normally in raised position and having means for moving the latch to releasing position when it is lowered, mechanical train operated means for normally holding the third bar raised and whereby it is reciprocated by a train for moving the latch to releasing position, and means operated by the third bar for operating the actuating means to store reserve power therein.

19. In a railway signal mechanism, a vertical reciprocatory signal operating bar, a latch carried thereby, a second vertical reciprocatory bar having means engageable under said latch, actuating means for reciprocating the second bar, the second bar being normally raised, to hold the signal operating bar in raised position, means for normally locking the actuating means, train controlled means for moving the locking means to releasing position, a third vertical reciprocatory bar, train controlled means for normally holding the third bar in raised position, a lever engaged with the third bar, the second bar having means engageable with the lever for raising the third bar when the second bar is lowered, means operated by said lever for moving said latch to releasing position from the second bar, a normally raised vertical reciprocatory bar having means when lowered for moving the latch to releasing position, mechanical train controlled means for normally holding the fourth mentioned bar raised and for reciprocating said bar to move the latch to releasing position and return said bar to normal position, and means operated by the fourth mentioned bar for operating the actuating means to store reserve power therein.

20. In a railway signal mechanism, a normally raised vertical reciprocatory signal operating bar, a latch carried thereby, a second vertical reciprocatory bar having means engageable under said latch, actuating means connected to the second bar for reciprocating it and including a wheel, a lock coöperable with said wheel for holding it with the second bar either raised or lowered, a third vertical reciprocatory bar, a wheel geared to the third bar, a relay whose armature has spring means normally engaging said wheel to hold the third bar raised, a normally closed track circuit including the magnets of said relay, a lever operatively engaged with the third bar, means operated by the lever for moving said latch to relasing position from the second bar, the second bar having means engageable with the lever whereby when the second bar is lowered, the third bar is raised, a fourth vertical reciprocatory bar having means for moving the latch to releasing position when the fourth bar is lowered, mechanical train operated means normally holding the fourth bar raised and operable to reciprocate said bar, means operated by the fourth bar for operating the actuating means to store reserve power therein, an electrical circuit including an electrically operated device for moving said lock to releasing position and including portions connected in parallel, said spring means and wheel providing a normally closed switch for one of said portions, a normally open switch for said portion operated by the second bar and closed when said second bar is lowered, a normally open switch for the other parallel portion operated by the third bar and closed when said third bar is lowered, and a normally closed switch for the second mentioned parallel portion and operated by the second bar to be opened when said second bar is lowered.

In testimony that I claim the foregoing as my own, I have hereto affixed my signature in the presence of two witnesses.

ROBERT F. HUDSON.

Witnesses:
EDWARD L. RYAN,
E. RALEIGH PHILLIPS.